US007138156B1

United States Patent
(12) Myrick et al.

(10) Patent No.: US 7,138,156 B1

(45) Date of Patent: Nov. 21, 2006

(54) FILTER DESIGN ALGORITHM FOR MULTI-VARIATE OPTICAL COMPUTING

(76) Inventors: Michael L. Myrick, 631 Sumter St., Columbia, SC (US) 29208; Olusola O. Soyemi, 1035 Aster Ave., Apartment 2114, Sunnyvale, CA (US) 94086; Paul J. Gemperline, E. Fifth St., Greenville, NC (US) 27858

( * ) Notice: Subject to any disclaimer, the term of this patent is extended or adjusted under 35 U.S.C. 154(b) by 839 days.

(21) Appl. No.: 09/964,194

(22) Filed: Sep. 26, 2001

Related U.S. Application Data

(60) Provisional application No. 60/235,336, filed on Sep. 26, 2000.

(51) Int. Cl.
*B05D 16/52* (2006.01)
*C23C 14/54* (2006.01)

(52) U.S. Cl. ................ 427/10; 427/8; 427/9; 427/162; 427/164; 427/166; 427/402; 427/419.3; 359/359; 359/580; 359/582; 359/588; 359/589; 359/885

(58) Field of Classification Search .......... 422/99–104, 422/63–65; 436/45, 47; 427/8, 9, 10, 162, 427/164, 166, 402, 419.3; 359/359, 580, 359/582, 588, 589, 885
See application file for complete search history.

(56) References Cited

U.S. PATENT DOCUMENTS

| | | | | |
|---|---|---|---|---|
| 4,084,880 A | | 4/1978 | Clow | 350/3.72 |
| 4,118,106 A | | 10/1978 | Leith | 350/96.25 |
| 4,536,063 A | * | 8/1985 | Southwell | 359/488 |
| 4,666,250 A | * | 5/1987 | Southwell | 359/586 |
| 4,687,335 A | | 8/1987 | Zupanick et al. | 356/416 |
| 4,793,669 A | * | 12/1988 | Perilloux | 359/355 |
| 4,821,338 A | | 4/1989 | Naruse et al. | 455/617 |
| 4,896,928 A | * | 1/1990 | Perilloux et al. | 359/359 |
| 4,934,782 A | | 6/1990 | Soffer et al. | 350/162.12 |
| 5,005,946 A | | 4/1991 | Brandstetter | 350/162.12 |
| 5,029,245 A | | 7/1991 | Keranen et al. | 250/205 |
| 5,090,807 A | | 2/1992 | Tai | 356/310 |
| 5,194,921 A | | 3/1993 | Tambo et al. | 356/432 |
| 5,289,289 A | | 2/1994 | Nagasaki | 358/432 |
| 5,296,961 A | * | 3/1994 | Trost et al. | 359/359 |

(Continued)

FOREIGN PATENT DOCUMENTS

EP 0600334 A2 6/1994

(Continued)

OTHER PUBLICATIONS

Soyemi et al., "Design and Testing of a Multivariate Optical Element: The First Demonstration of Multivariate Optical Computing for Predictive Spectroscopy", Anal. Chem., vol. 73, No. 6, pp. 1069-1079, Mar. 15, 2001 (Feb. 10, 2001 on the web).*

(Continued)

*Primary Examiner*—Alain L. Bashore
(74) *Attorney, Agent, or Firm*—Nelson Mullins Riley & Scarborough, LLP

(57) ABSTRACT

Within a method of making an optical interference filter, sample spectra and measurements of a predetermined characteristic associated with respective spectra are provided. Upon selection of an initial number of filter layers and a thickness for each layer, a transmission spectrum is determined. Each sample spectrum is applied to a regression formula that relates interaction of light with the transmission spectrum to a regression value. A comparison relationship between the calculated regression values and the sample measurements is defined and optimized, wherein thickness of each layer is an optimization variable.

24 Claims, 7 Drawing Sheets

U.S. PATENT DOCUMENTS

| | | | | |
|---|---|---|---|---|
| 5,321,539 | A | 6/1994 | Hirabayashi et al. | 359/94 |
| 5,412,465 | A | 5/1995 | Baylor et al. | 356/301 |
| 5,424,545 | A | 6/1995 | Block et al. | 250/343 |
| 5,459,677 | A | 10/1995 | Kowalski et al. | 364/571.02 |
| 5,479,164 | A | 12/1995 | Yorks et al. | 341/50 |
| 5,513,022 | A | 4/1996 | Son et al. | 359/16 |
| 5,555,128 | A | 9/1996 | Khoury et al. | 359/559 |
| 5,717,605 | A | 2/1998 | Komiya et al. | 364/526 |
| 5,737,076 | A | 4/1998 | Glaus et al. | 356/310 |
| 5,747,806 | A | 5/1998 | Khalil et al. | 250/339.12 |
| 5,750,994 | A | 5/1998 | Schlager | 250/339.11 |
| 5,771,096 | A | 6/1998 | Andersen | 356/346 |
| 5,828,492 | A | 10/1998 | Moser et al. | 359/575 |
| 5,945,676 | A | 8/1999 | Khalil et al. | 250/339.12 |
| 6,040,578 | A | 3/2000 | Malin et al. | 250/339.12 |
| 6,074,730 | A * | 6/2000 | Laird et al. | 428/212 |
| 6,198,531 | B1 | 3/2001 | Myrick et al. | 356/300 |
| 6,236,047 | B1 | 5/2001 | Malin et al. | 250/339.12 |

FOREIGN PATENT DOCUMENTS

| | | |
|---|---|---|
| JP | 04001558 | 7/1992 |
| JP | 11506206 | 2/1999 |
| JP | 11506207 | 2/1999 |
| WO | WO9630746 | 10/1996 |

OTHER PUBLICATIONS

Soyemi et al., "Novel Filter Design Algorithm for Multivariate Optical Computing", Proceedings of SPIE, vol. 4205, pp. 288-299, Feb. 2001.*

Photographs of Buhler System.

J.A. Dobrowolski and R.A. Kemp, "Refinement of Optical Multilayer Systems With Different Optimization Procedures," *Applied Optics*, vol. 29; No. 19, Jul. 1990, pp. 2876-2893.

Brian T. Sullivan and J.A. Dobrowolski, "Implementation of Numerical Needle Method for Thin-Film Design," *Applied Optics*, vol. 35; No. 28, Oct. 1996, pp. 5484-5492.

A.G. Ryabenko and G.G. Kasparov, "An Algorithm for Constructing the Basis of Optimal Linear Combinations. Spectral Determination of Aerosol Impurities against the Background of a Water Aerosol with an Arbitrary Particle Size Distribution," *Pattern Recognition and Image Analysis*, vol. 3; No. 1, Mar. 1993, pp. 348-354.

A.G. Ryabenko and G.G Kasparov , "Numerical Study of a Pattern Recognition Multispectral System with Optimal Spectral Splitting," *Pattern Recognition and Image Analysis*, vol. 1; No. 3, 1991, pp. 57-68.

Vasil'ev, et al, "Rotational and Vibrational Deactivation of Excited HF Molecules," *Sov. Physics—JETP*, vol. 41; No. 4, 1976, pp. 617-621.

Moravskii, et al., "Spectrophotometric Determination of the Yield of the $C_{60}$ and $C_{70}$ Fullerness in Electric Arc Synthesis under Helium," *Journal of Analytical Chemistry*, vol. 53; No. 12, 1998, pp. 1135-1142.

International Search Report, Jan. 19, 1999.

International Search Report; Jan. 21, 2000.

DiFoggio, Rocco. "Guidelines for Applying Chemometrics to Spectra: Feasibility and Error Propagation," Journal of Applied Spectroscopy, 54/3 (Mar. 2000); pp. 94A-113A.

* cited by examiner

FILTER DESIGN ALGORITHM FOR MULTI-VARIATE OPTICAL COMPUTING

This application claims priority to U.S. Provisional Application No. 60/235,336 filed Sep. 26, 2000, the entire disclosure of which is incorporated herein by reference.

The U.S. Government has a paid-up license in this invention and the right in limited circumstances to require the patent owner to license others on reasonable terms as provided for by the terms of Grant No. N00014-97-1-0806 awarded by the Office of Naval Research and Grant No. F33615-00-2-6059 awarded by the Air Force Research Laboratory.

BACKGROUND OF THE INVENTION

The present invention relates to the design of optical filters for use in spectroscopy analysis systems.

As described in U.S. Pat. No. 6,198,531, the entire disclosure of which is incorporated by reference herein, methods are known by which to construct optical filters having predetermined transmission spectra. In general, such an optical filter is an interference filter having alternating layers of high and low refractive index materials. By properly selecting the materials and layer thicknesses, the filter can be made to selectively pass predetermined percentages of incident light at different wavelengths, where the transmission percentage varies over the wavelength range.

One method of designing such a filter begins with a desired transmission spectrum and a selection of materials for the filter layers. Given this information, an algorithm optimizes the number of layers and their thicknesses to define a filter having a transmission spectrum that differs from the desired spectrum by an amount within an acceptable error tolerance. The procedure relies upon a merit function ("MF") that describes the difference between the desired spectrum and any other spectrum:

$$MF=\Sigma_W(T_c-T_t)^k/W, \quad \text{(equation 1a)}$$

where $T_c$ is the transmission percentage of the "other" transmission spectrum at a given wavelength, $T_t$, is the transmission percentage of the desired, or "target," spectrum at the same wavelength, W is the number of wavelength channels measured and used in the merit function, and k is a constant. As should be understood in the art, constant k is a factor that determines the weighting applied in the MF to higher order differences between $T_c$ and $T_t$. If k is equal to 1, the merit function calculates average error between the two transmission spectra. A constant of 2 provides a mean square error.

Other merit functions may be used, for example:

$$MF=(1/W)\Sigma_W((T_c-T_t)^k/T_{Ol})1/k, \quad \text{(equation 1b)}$$

where $T_{Ol}$ is the design tolerance. In another merit function, $$MF(x)=\Sigma_m(R_o(m)-R(x,m))^2, \quad \text{(equation 1c)}$$

where x is the vector of design variables, $R_o$ is the specified reflectance at wavelength m, and R is the computed value of reflectance at m for particular values of x.

To determine the "other" transmission spectrum, the user makes an initial guess of the number of filter layers and their thicknesses. The layer materials, the substrate material and thickness, and the incident material (i.e. the material through which the light sample passes in travelling to the filter—typically air) are selected as initial conditions. The transmission spectrum of the resulting optical filter, constructed according to the design defined by the initial conditions and the initial guess, is determined. Procedures for determining a transmission spectrum from such information are known and are described in more detail below.

Referring to FIG. 1, if the thickness of each layer defines an axis in a coordinate system, a plot of the merit function as a function of layer thickness produces a cup-shaped surface 8 that is parabolic in any given cross-section parallel to the merit function axis. Thus, if the thicknesses of layers 1 and 2 are O and P, respectively, the error between the resulting transmission spectrum and the desired spectrum, as defined by the merit function, is the MF axis value of point B on surface 8. Once on surface 8, a quasi-Newton method of nonlinear optimization may be used to find points on surface 8 that are successively closer to the surface's minimum point A, eventually finding point A or a point acceptably close to point A.

Point A corresponds to thicknesses M and N of layers 1 and 2, respectively. The merit function value at these thicknesses, using the assumed materials and substrate, is not zero. That is, it is impossible under the assumed conditions to achieve the desired transmission spectrum. If the error represented by this merit function value is unacceptable, a second guess is made that includes a third layer of a material with a refractive index different from that of the second layer. The third guess may begin with the thicknesses determined in the first iteration for the first two layers, or the user may choose three new thicknesses. In either event, the algorithm re-optimizes for all three layer thicknesses, and the third guess therefore results in a four-dimensional space. The algorithm proceeds in the same manner outlined above, except with an additional thickness variable, and continues to add layers until the merit function value falls within the acceptable tolerance, thereby establishing the final filter design. A computer program distributed under the name TFCALC by Software Spectra, Inc. of Portland, Oreg. may be used to execute this iterative method of designing thin film layers.

A procedure for determining a transmission spectrum of an optical filter defined by an assumption of layer thicknesses and selection of layer materials, substrate material, substrate thickness and incident medium is based on a matrix method. Each filter layer is associated with a matrix $Y_1$ as follows:

$$Y_l = \begin{matrix} \cos\delta & i/n\sin\delta \\ in\sin\delta & \cos\delta \end{matrix} \quad \text{(equation2)}$$

n is a complex refractive index:

$$n=n_1+ik_1, \quad \text{(equation 3)}$$

where $n_1$ is the real refractive index, and $k_1$ is the absorption coefficient. δ is a phase factor defined as:

$$\delta=(2\Pi n_1k_1x/\lambda)\cos\theta_1, \quad \text{(equation 4)}$$

where λ is wavelength, x is layer thickness, and $\theta_1$ is the interior angle of propagation in layer 1. For normally incident light, $\cos\theta_1=1$. For tilted filters, however, in which the incident angle is oblique, $$\cos\theta_1=(1-(n_o^2\sin^2\theta_o)/n_1^2)^{0.5}, \quad \text{(equation 5)}$$

where $n_0$ is the refractive index of the incident medium (e.g. air), and $\theta_0$ is the angle of incidence in radians. The characteristic matrix of the entire film stack (M) is determined by multiplying the individual layer matrices:

$$M=Y_1\times Y_2\times \ldots \times Y_l, \quad \text{(equation 6)}$$

where layer 1 is the layer closest to the substrate.

Light transmitted through the film layers includes an electric vector component, E, and a magnetic vector component, H. The characteristic matrix M relates the electric and magnetic fields at individual layer boundaries as follows:

$$\begin{vmatrix} E \\ H \end{vmatrix} = Mx\begin{vmatrix} 1 \\ n_s + ik_s \end{vmatrix} \quad \text{(equation 7)}$$

where $n_s$ and $k_s$ are the substrate's refractive index and absorption coefficient.

The propagation of light through a single thin film coating is illustrated in FIG. 11. As indicated in the figure, there are multiple reflections of incident light at the air/film and substrate/air interfaces. The transmittance and reflectance at the air/film interface are:

$$T_1=(4n_s n)/(n+n_s)^2, \text{ and} \quad \text{(equation 8)}$$

$$R_1=1-T_1. \quad \text{(equation 9)}$$

For normally incident light, $n=n_o=1$, where n is the refractive index. When the filter is tilted, however, the propagated wave splits into two plane-polarized components, one with the electric vector in the plane of incidence ("p-polarized"), and one with the electric vector normal to the plane of incidence ("s-polarized"). The refractive index of the incident light is therefore modified as follows:

$$n=n_o/\cos\theta_o (\text{p-polarization}), \text{ and} \quad \text{(equation 10)}$$

$$n=n_o \cos\theta_o \text{ (s-polarization)}. \quad \text{(equation 11)}$$

The transmittance and reflectance of the next interface, $T_2$ and $R_2$, are related to the real and imaginary components of E and H (i.e., $E_1$, $E_2$ and $H_1$, $H_2$) determined from equation 7:

$$T_2=(4n_s n)/((E_1+H_1)^2+(E_2+H_2)^2) \quad \text{(equation 12)}$$

$$R_2=((E_1-H_1)^2+(E_2-H_2)^2/((E_1+H_1)^2+(E_2+H_2)^2) \quad \text{(equation 13)}$$

The total transmittance of the film and substrate at a given wavelength channel can be determined by summing the infinite series of the combined reflectance and transmittance terms, i.e., $T_1T_2$, $T_1T_2R_1R_2$, $T_1T_2(R_1R_2)^2$, $T_1T_2(R_1R_2)^3$, etc. The method for calculating total reflectance is performed in a like manner. This results in the following expressions for total transmittance T and reflectance R:

$$T(\lambda, x, n_1, n_s, \theta_o)=100(T_1T_2)/(1-R_1R_2), \quad \text{(equation 14a)}$$

$$R(\lambda, x, n_1, n_s, \theta_o)=100(R_1'+T_1'T_1R_2/(1-R_1R_2), \quad \text{(equation 14b)}$$

where $n_1$ and $n_s$ are the complex refractive indices of layer 1 and substrate s.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
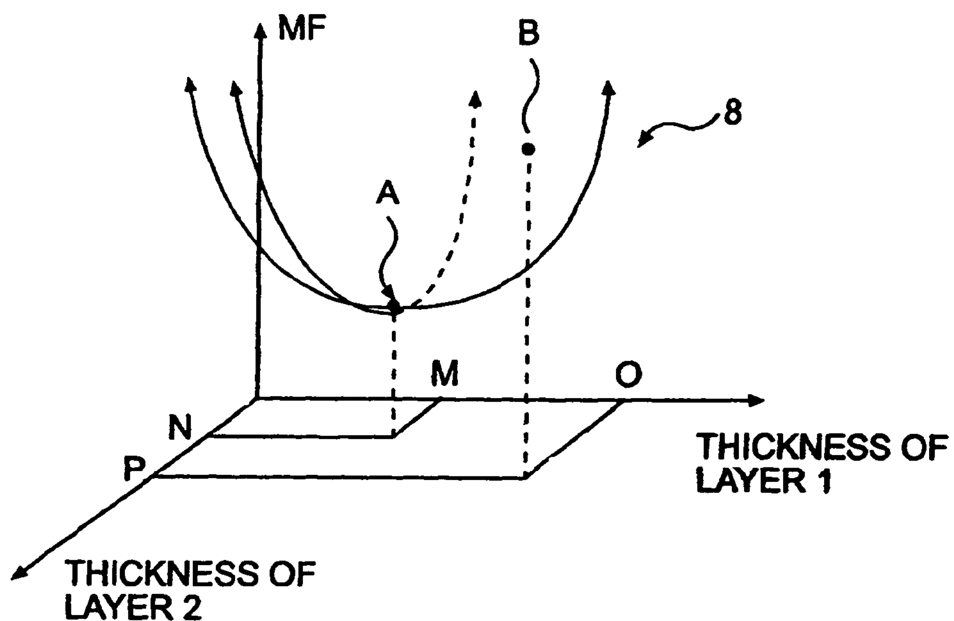
FIG. 1 is a graphical representation of a merit function for a two-layer thin film optimization.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In one embodiment of the present invention, optical filter design parameters are optimized to conform to sample spectroscopic measurements, as opposed solely to a predetermined regression vector. As described in the '531 patent, a regression vector formula may be written in terms of wavelength space in a form such as:

$$Y=a_o+b_1u_1+b_2u_2+ \ldots +b_nu_n, \quad \text{(equation 15)}$$

where y is the value of the desired characteristic to be determined from the measured spectrum, $a_0$ is the first regression constant, $b_n$ is the regression constant at the $n^{th}$ wavelength channel, and $u_n$ is the intensity of the sample spectrum at the same channel. In known spectroscopic systems, several samples of a given material may be measured using conventional non-spectroscopic methods to determine a desired characteristic of the material for each sample. If a light spectrum is taken for each sample and compared to the measured characteristics, it is possible to determine a regression vector that can be used to find the value of the desired characteristic in future samples. This procedure is described in the '531 patent.

Referring to equation 2, a sample's spectrum defines the wavelength channel values $u_n$, and the optical filter's transmission spectrum is defined according to the regression vector constants $b_n$. Thus, if light from the sample passes through the optical filter, the filter's output is the dot product of the sample's spectrum and the regression vector components in wavelength space. The addition of the offset value $a_0$ to the filter's output therefore provides the solution to the regression vector formula at equation 15, i.e. the value of the desired characteristic for the sample.

Accordingly, it is possible to define the regression vector using conventional means and then develop an optical filter structure according to the iterative method described above in the Background section. In a preferred embodiment of the present invention, however, the filter's design parameters are optimized to the initial sample data itself, rather than solely to a predetermined regression vector derived from that data. As an example, assume it is desired to develop an optical filter to measure octane in gasoline. Initially, several gasoline samples are measured for octane by conventional means, and the spectrum for each sample is recorded. The number of samples may vary as desired, although it should be understood that measurement errors tend to decrease with an increasing number of samples.

Figure 2:
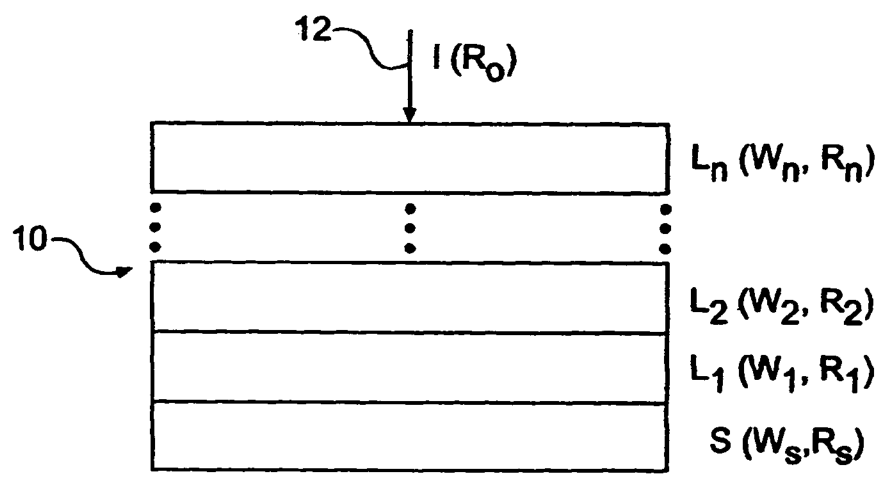
FIG. 2 is a schematic illustration of an optical filter.

Referring to FIG. 2, the dimensions of a filter 10 are as yet undetermined, but it will have a substrate S and some number n of layers L of alternatingly high and low refractive indices. Each of the substrate and the layers has a thickness W and a refractive index R. Light, 12, has an intensity I that varies across the relevant wavelength range. It passes through an incident medium (typically air) that has its own refractive index, $R_o$. Exemplary filter layer materials include $Nb_2O_5$, which has a high refractive index, and $SiO_2$, which has a low refractive index, although it should be understood that various materials could be used. These materials alternatingly form the successive filter layers. In general, it is desirable that the materials have minimal internal stress and tend not to absorb light or form non-uniform films. The substrate material and thickness may also vary as desired. In one embodiment, a 1 mm thick BK-7 glass substrate is used.

Figure 3:
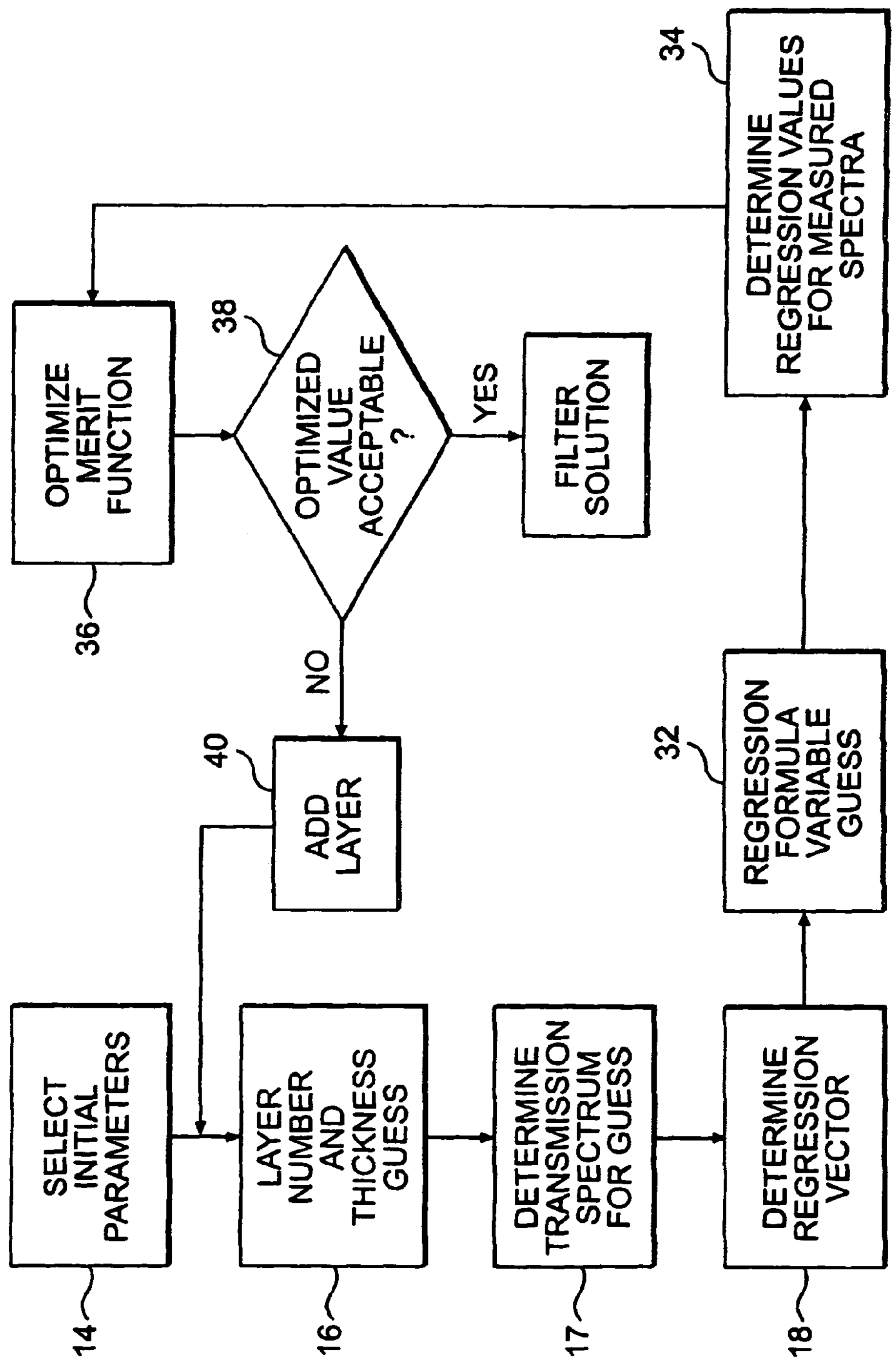
FIG. 3 is a flow diagram of an optimization algorithm according to an embodiment of the present invention.

Referring to FIG. 3, the incident medium, filter layer materials, substrate material and substrate thickness are selected at 14 prior to an iterative optimization process that determines layer thicknesses. It should be understood, however, that one or more of these variables may also be included in an optimization algorithm. An initial guess is made at 16 for the number of layers and the thickness of each layer. Although these variables may be selected at random, the method for manufacturing the filter is preferably considered. For example, if a reactive magnetron sputtering method is used, it is generally undesirable to have layers with a thickness less than 20 nm or greater than 100 nm, and the initial thickness guesses are preferably within this range. Additional initial guess procedures are described in detail below. For example, it can be desirable to make multiple guesses to account for the possibility of different optimization solutions.

Once the layer number/thickness guess is made at 16, the transmission spectrum for an optical filter based on the guess and initial conditions at 14 is determined at 17 according to the matrix method described above or other suitable procedure.

The transmission spectrum is converted to a regression vector at 18. The regression vector formula at equation 15 may be rewritten as follows:

$$Y=a_o+L\cdot S, \qquad \text{(equation 16)}$$

where L is the regression vector in wavelength space, and S is the sample spectrum in wavelength space. It is likely that the best regression vector solution will have negative values. The filter's transmission spectrum, however, is entirely between 0 and 100%. Thus, a filter arrangement is used that translates an all-positive transmission spectrum to a regression vector with both positive and negative components.

Figure 4:
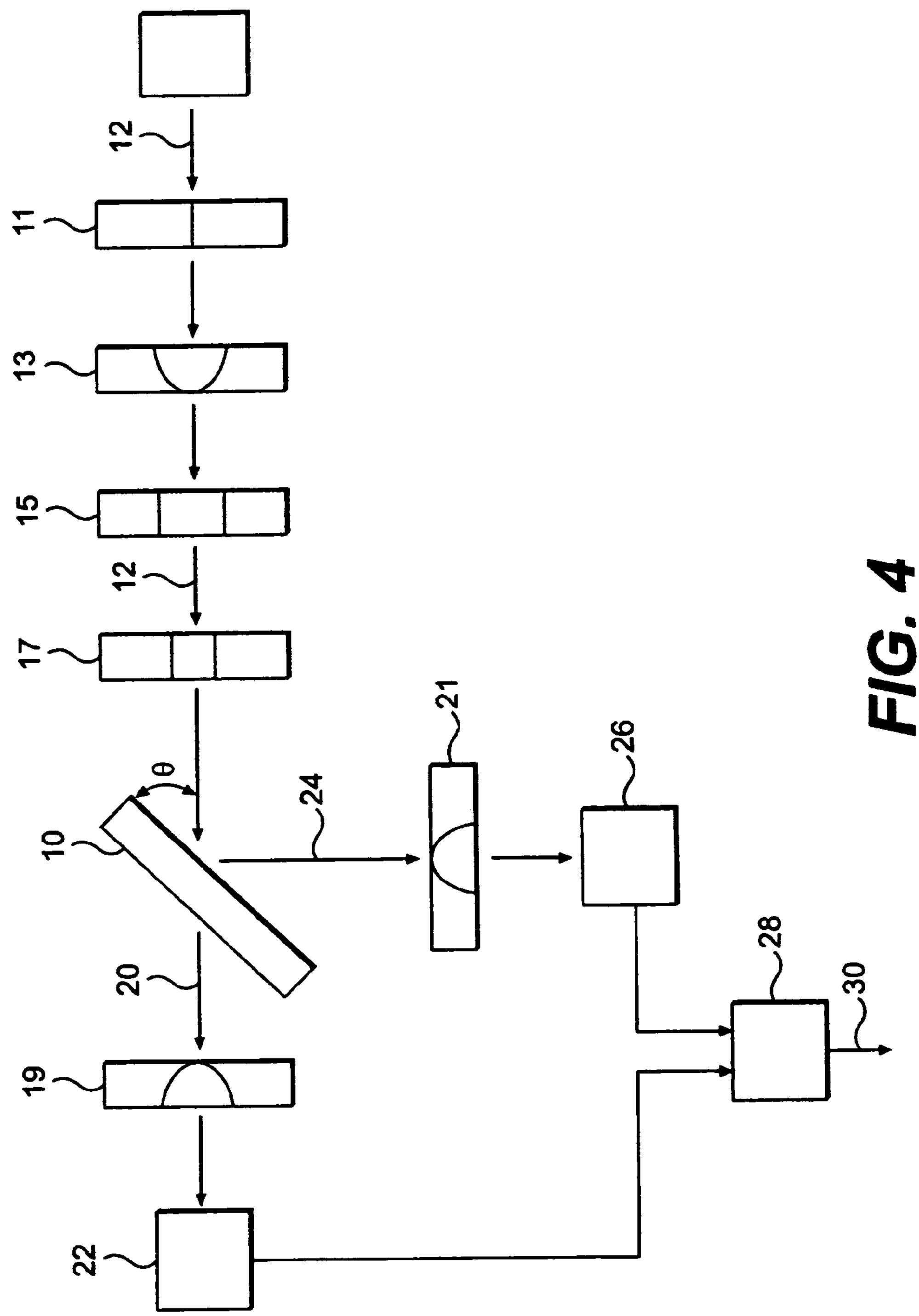
FIG. 4 is a partial schematic illustration of a spectroscopic analysis system according to an embodiment of the present invention.

Referring to FIG. 4, a single filter 10 may be used to effect a full regression vector where the filter is tilted so that a sample light beam 12 is incident to filter 10 at an acute angle θ so that the intensity of light 20 passing through the filter is measured by a first light detector 22 and so that the intensity of light 24 reflected from filter 10 is measured by a second light detector 26. In a preferred embodiment, θ is 45 degrees, although it should be understood that the filter may be disposed at other angles. Prior to reaching filter 10, light 12 passes through a pin-hole 11, a collimating lens 13, a band pass filter 15, and the sample substance itself, 17. Light 20 and 24 is focused on the respective detectors by lenses 19 and 21.

Each of detectors 22 and 26 outputs a signal corresponding to the intensity of its incident light to a processor 28, which may be any suitable device or arrangement (such as a computer or logic circuitry) capable of performing the appropriate mathematical functions. Processor 28 subtracts the output of detector 26 from the output of detector 22 and outputs a signal equal to this value at 30.

Where no light is absorbed by filter 10, transmitted light 20 ("T") and reflected light 24 ("R") are related to one another by:

$$R=1-T \qquad \text{(equation 17)}$$

Output 30 may then be described as follows:

$$V_o=a_o+G\times I\times T\times Q\cdot S-G\times I\times R\times Q\cdot S, \qquad \text{(equation 18)}$$

where $V_o$ is the value of output 30, G is the gain of processor 28 (which may include a difference amplifier), I is the intensity of sample light beam 12, and Q is the sensitivity of detectors 22 and 26. S is the spectrum of incident light beam 12, in terms of percentage values over the wavelength range. Thus, the intensity of light beam 12 at any wavelength channel is the percentage value of spectrum S at that wavelength multiplied by intensity I. For ease of explanation, the present discussion assumes that detector sensitivity Q is the same for both detectors 22 and 26 and that no light is absorbed by filter 10. Where filter 10 absorbs light, reflectance R is calculated as in equation 14b. This does not, however, fundamentally change the characteristics of the method, as should be understood by those skilled in this art.

If processor gain G and detector sensitivity Q are collectively considered to be a total gain value $G_T$, if light intensity I is combined into sample spectrum S and if equation 17 is substituted into equation 18, output 30 becomes:

$$V_o=a_o+G_T\times(2T-1)\cdot S \qquad \text{(equation 19)}$$

As should be apparent, the (2T−1) term in equation 19, as well as in equations 20 and 21, is equal to, and may be replaced with, (T−R). Comparing equation 19 with equation 16, the regression vector L may be described as follows:

$$L=G_T(2T-1). \qquad \text{(equation 20)}$$

Since the transmission values of the filter's transmission spectrum are between 0 and 100%, the values of regression vector L range between −100% and 100%. Thus, by using the difference between the filter's transmitted and reflected light, the system translates an all-positive transmission pattern into a full-range regression vector.

Substituting equation 7 into equation 3, the regression formula is:

$$Y=a_o+G_T(2T-1)\cdot S. \quad \text{(equation 21)}$$

The transmission spectrum T is known, but $a_o$ and $G_T$ are not. Accordingly, the user provides a guess for these regression formula variables at 32. Since the gain and offset values may be determined arbitrarily through processor 28, these variables may be chosen at random.

Given these assumptions, equation 21 provides a regression formula into which the spectra of the measured gasoline samples may be applied. Assuming there are ten samples, equation 21 produces ten octane values. Given that the values are the result of the design parameter guesses at 16 and 32, it is expected that the ten values calculated at 34 will not equal the actual octane values measured for the ten samples. Accordingly, the system executes a merit function that compares the calculated and actual values, and optimizes the merit function (optimizing for the calculated values), at 36. It should be understood that various suitable functions may be used to compare the calculated and actual values. In a preferred embodiment, however, the merit function is a root mean square calculation:

$$RMS=(\Sigma_{i=1}^{n}(y_c-y_t)^2/m)^{0.5}, \quad \text{(equation 22)}$$

where $y_c$ is the octane rating determined for a particular sample i from equation 21, $y_t$ is the sample's actual octane rating, n is the number of samples, and m=n−1.

A plot of all possible RMS values as a function of the thicknesses of each filter layer and the regression formula's gain and offset values (i.e. a plot in a five-dimensional space if the initial guess includes two layers) produces a surface that may have multiple local minima. The RMS value resulting from the initial guesses at 16 and 32 corresponds to a point on this surface, and a quasi-Newton method optimizes this point to a local minima on the merit function surface, as should be understood in this art. That is, the quasi-Newton method iteratively changes the thickness values of each layer, and also changes the regression formula gain and offset, while minimizing the RMS value. If, at 38, the optimized RMS value is within an acceptable range, the filter design parameters produced by the optimization correspond to an acceptable filter. If not, the algorithm assumes an additional filter layer at 40 and begins a new optimization sequence with an initial guess of the thicknesses of the filter layers at 16. The new guesses at 16 and 32 may include the optimized values from the previous optimization sequence, although it should be understood that completely new guesses may be made.

The quasi-Newton method builds curvature (gradient) information to formulate a quadratic model problem of the form:

$$\min((1/2)z^T H_z+c^T z+b), \quad \text{(equation 23)}$$

where z is the vector of N optimization parameters, the Hessian matrix, H, is a positive definite symmetric matrix, c is a constant vector, and b is a constant. The optimization converges to a solution corresponding to the lowest RMS value when the partial derivatives of z go to zero, i.e. when:

$$\nabla f(z^*)=H_z^*+c=o. \quad \text{(equation 24)}$$

The optimal solution point, z*, can be written as:

$$z^*=-H^{-1}c. \quad \text{(equation 25)}$$

At the starting point, H can be set to any positive definite matrix (e.g. the identity matrix). The observed behavior of the derivative and partial derivative of z provides curvature information to make an approximation of H using the updating BFGS (Broyden, Fletcher, Goaldfarb and Shanno) formula given by:

$$H_{k+1}=H_k+q_k(q_k)^T/q_k)^T S_k-(H_k)^T(S_k)^T S_k H_k/(S_k)^T H_k S_k, \quad \text{(equation 26)}$$

where $$S_k=z_{k+1}-z_k, \text{ and} \quad \text{(equation 27)}$$

$$q_k=\nabla f(z_{k+1})-\nabla f(z_k). \quad \text{(equation 28)}$$

The gradient information is provided by perturbing each of the design variables, in this case the layer thicknesses and the regression formula gain and offset, in turn and calculating the rate of change in the RMS value. At each major iteration k, a line search is determined in a direction in which the solution is estimated to lie, and is determined by:

$$d=-H_k^{-1}\cdot f(z_k). \quad \text{(equation 29)}$$

As noted above, layers of large thicknesses may become difficult or impractical to manufacture. In addition, very thin layers do not contribute appreciably to the filter's transmission curve. Thus, during optimization at 36, if a layer thickness falls below a specified threshold value (e.g. 0.5 nm and 20 nm in preferred embodiments), the optimization ends, and the layer is eliminated from consideration. The optimization resumes with the design parameter values at the point where the optimization stopped, less the thickness value and dimension associated with the removed layer. In another embodiment, the procedure also removes any layer exceeding a predetermined threshold thickness, for example 100 nm.

As described above, the merit function used in the optimization at 36 may have multiple local minima. The optimization result therefore depends on the starting point defined by the guesses at 16 and 32. In a preferred embodiment, therefore, several solutions are derived through the procedure illustrated in FIG. 3, each beginning with a different set of design parameter guesses for the same initial parameters selected at 14. Again, it is possible to randomly select the design parameter guesses, but it is preferred that they be spaced relatively evenly over a desired range of values to assure that the initial guesses are spaced far enough apart on the merit function surface that an effective number of solutions are achieved. In this embodiment, the loop indicated at 40 in FIG. 3 is eliminated. Since the procedure automatically removes layers that are too small, and since the procedure begins from as many starting points as desired, acceptable solutions are typically determined without the need to add layers, and the procedure therefore determines only one solution for each starting point.

In this arrangement, it is desirable that some or all of the starting points have a large number of layers. Because the algorithm automatically removes layers that are too small (and, in another embodiment, too large), the various starting points relatively quickly optimize down to solutions having different numbers of layers.

Since each filter described by each solution can be used to describe the value of the desired characteristic from future sample spectra, the user may select any of the solutions as the design that will be manufactured. For example, the user may choose the solution that minimizes construction inaccuracies. As should be understood in this art, the yield rate of acceptably accurate optical filters will depend upon the number of layers and the thicknesses of those layers. Therefore, a user may choose a filter from among the possible acceptable filters that minimizes the number of layers and the thicknesses of those layers.

In another preferred embodiment, only a single starting point is required. Referring to FIG. 3, the user selects the number of layers, the layer materials and the substrate at 14 and guesses the layer thicknesses at 16. The transmission spectrum of the proposed filter and its regression vector are determined at 17 and 18, respectively, again assuming that the filter is tilted by 45 degrees as in FIG. 4. Additionally, a regression vector correlating the sample measurements (octane rating, in the example discussed herein) to the sample spectra is calculated by conventional means, as discussed in the '531 patent, for example by principal component regression and partial least squares. This calculated regression vector is then compared to the regression vector derived at 18 in a merit function such as described above in the Background section or as follows:

$$MF=\Sigma^{m}_{i=1}(L_c-L_i)^2, \quad \text{(equation 30)}$$

where $L_c$ is the regression vector calculated by conventional means, $L_i$ is the regression vector determined at 18 from the initial guess, and m is the number of wavelength channels. By iteratively changing the layers' thicknesses, the merit function may be minimized in a quasi-Newton method to determine the layer thicknesses that result in a regression vector at, or relatively close to, the calculated regression vector. Preferably, the optimization method executes only once. That is, it does not compare the merit function for an optimized solution to a predetermined threshold and repeat the optimization for additional layers until the threshold is met. It should be understood, however, that the method could include a layer-adding loop.

Once the layer thicknesses are optimized to the calculated regression vector, these thicknesses replace the initial thickness guesses at 16. A regression formula gain and offset guess is made at 32, and these design parameters are optimized to the original sample measurements at 34, 36 and 38 as described above.

In either method, the iterative optimization method produces an initial filter design. In a preferred embodiment, a reactive magnetron sputtering procedure is then used to form an optical filter based on this design. The use of reactive magnetron sputtering to deposit thin film coatings should be well understood in this art and is, therefore, described only generally herein. Reactive magnetron sputtering systems are available from Corona Vacuum Coatings, Inc. of Vancouver, BC, Canada.

Figure 5:
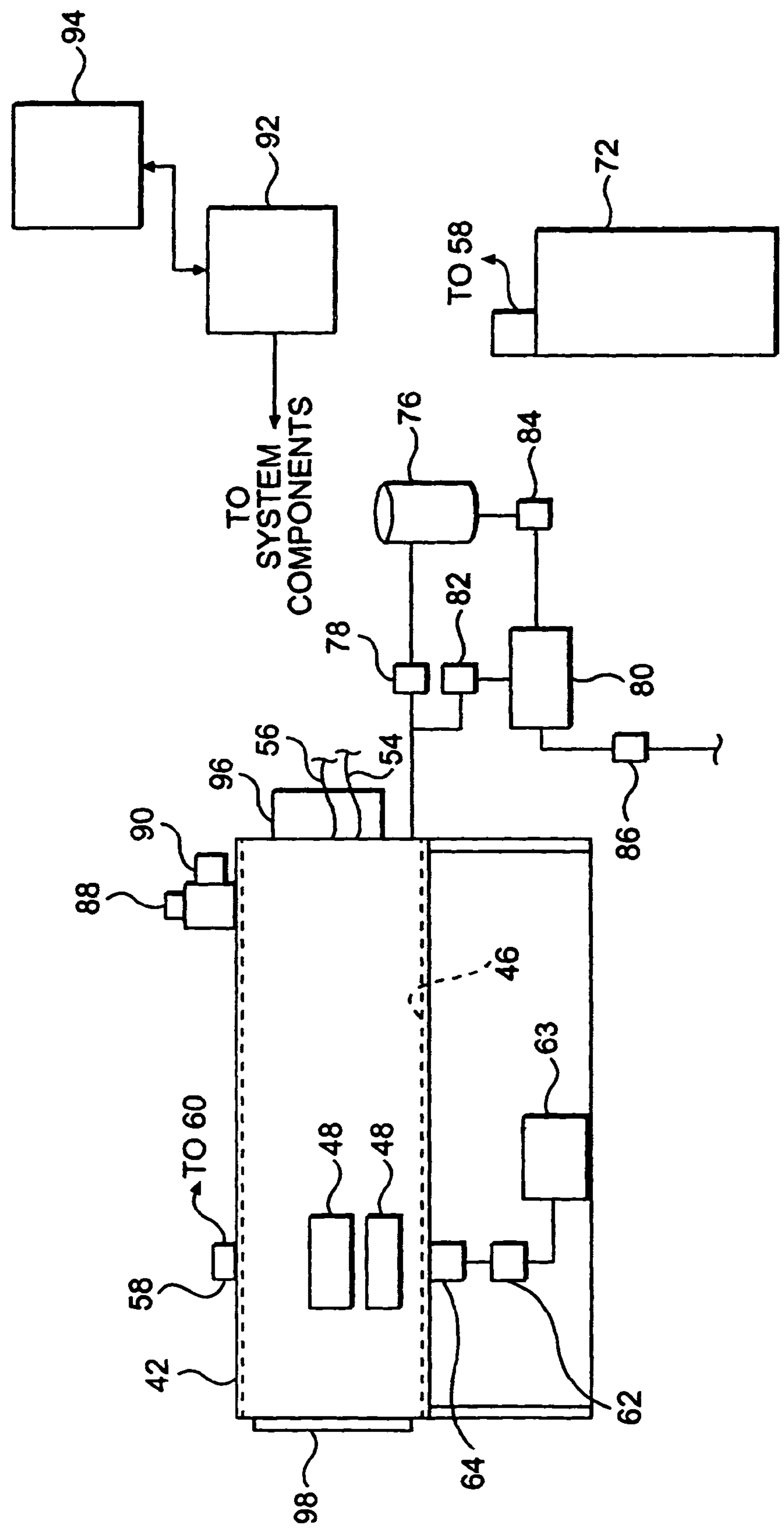
FIG. 5 is a schematic illustration of a reactive magnetron sputtering system according to an embodiment of the present invention.
Figure 6:
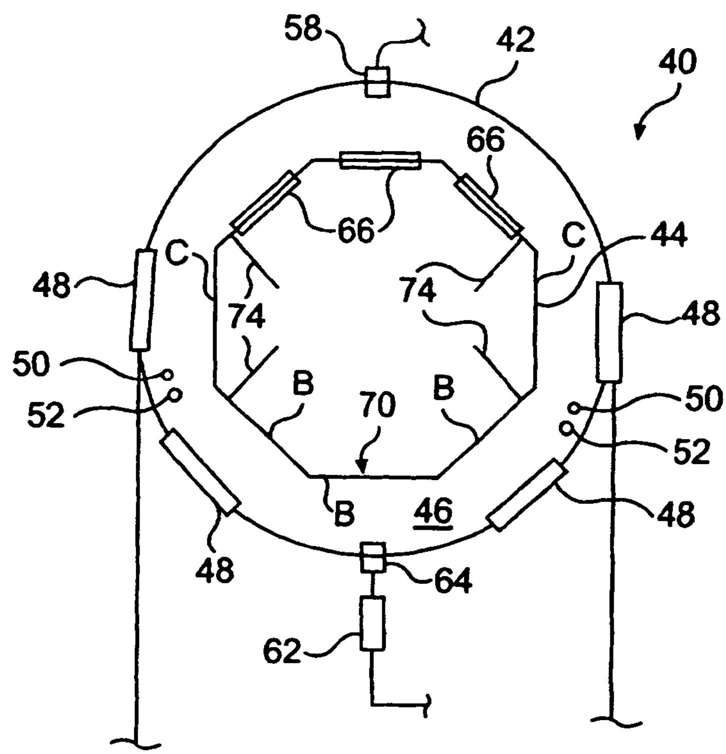
FIG. 6 is a partial front schematic view of the sputtering system as in FIG. 5.

Referring to FIGS. 5 and 6, a reactive magnetron sputtering system 40 includes a generally cylindrical steel housing 42 in which is rotatably disposed an inner steel drum 44 in a chamber 46. Four magnetrons 48 are disposed about outer steel housing 42 and extend through the housing into cavity 46. A pair of gas nozzles 50 and 52 inject gas from lines 54 and 56 into chamber 46.

A light sensor 58 extends through housing 42 and outputs to a spectrometer 60. A light source 62 below the housing directs light to a collimating lens 64 so that light from the light source passes through lens 64 into inner chamber 46. A power source 63 drives light source 62.

Figure 7:
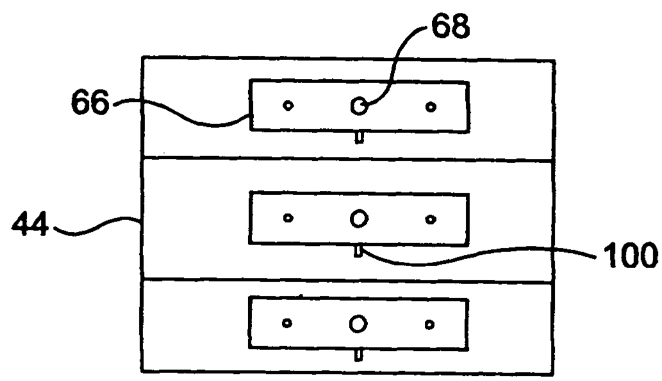
FIG. 7 is a side view of the inner drum shown in FIGS. 5 and 6.
Figure 8:
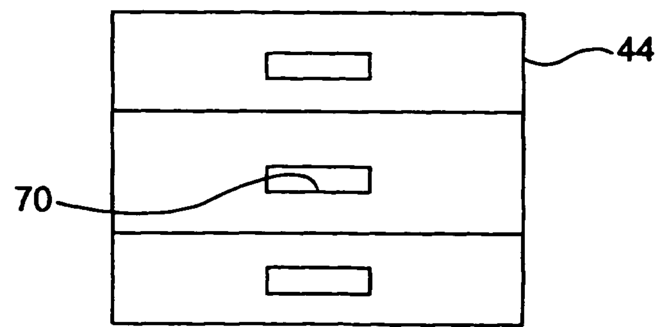
FIG. 8 is a side view of the inner drum shown in FIGS. 5 and 6.

Referring also to FIGS. 7 and 8, inner drum 44 is octagonal in cross-section. On three of the drum's flat longitudinal sides, indicated at A, a bracket 66 extends through the inner drum and defines a circular aperture 68 extending through the bracket. Sides B opposite sides A define elongated slots 70 extending through the drum. Sides C between sides A and B are solid. Planar vanes 74 extend inward from respective sides of the inner drum and extend longitudinally along the drum's interior. A motor 96 rotates drum 44 within chamber 46.

An RF power source 72 drives magnetrons 48. When the magnetrons are activated, and when gas is injected through nozzles 50 and 52 into inner area 46, the magnetrons create areas of plasma immediately in front of the magnetrons, as should be understood in this art.

Two pumps create an initial vacuum in chamber 46. A rotary vane pump 76 draws from chamber 46 through a valve 78. A diffusion pump 80 draws from chamber 46 through a valve 82. Rotary pump 76 also draws from pump 80 through a valve 84. A valve 86 controls water flow from a cold water source (not shown) to pump 80. A VARIAN CONVECTRON gauge 88 measures low vacuum conditions in interior area 46, while an ion gauge 90 measures high vacuum conditions.

A pair of general purpose personal computers 92 and 94 control the operation of sputtering system 40. Computer 92 controls power sources 63 and 72, pumps 76 and 80, light source 62, nozzles 50 and 52, valves 78, 82, 84, 80 and 86, and motor 96. Computer 92 receives pressure information from gauges 88 and 90 and receives spectra from spectrograph 60. Computer 94 is programmed to execute the filter optimization algorithm discussed above and provides control information to computer 92 so that computer 92 controls the magnetron sputtering system to form an optical filter based on the optimized design. In addition, computer 92 provides spectroscopic information to computer 94 with which computer 94 executes a re-optimization procedure discussed below. Filter design algorithms are programmed on computer 94 in MATLAB V6.12, available from The Mathworks, Inc. while a user interface located on computer 92 is programmed in LABVIEW 6I, available from National Instruments, Inc., although other suitable programming languages may also be used. Similarly, while a pair of computers are illustrated in FIG. 5, it should be understood that a single computer could be used to perform the functions of computers 92 and 94.

In operation, computer 94 determines the initial filter design parameters through an algorithm as described above. Upon receiving this information and a start-up request, computer 92 opens valves 78 and 84. Pump 76 is running and therefore begins to draw air and/or residual gas from chamber 46. Because motor 96 is sealed to housing 42, and a door 98 seals the front end of chamber 46, pump 76 begins to create a vacuum within the chamber. When pressure within chamber 46 reaches a predetermined pressure level corresponding generally to a low vacuum condition, for example $10^{-4}$ Torr, computer 92 closes valve 78 and opens valve 82 so that diffusion pump 80 removes remaining gases from chamber 46. Rotary pump 76 continues to draw from diffusion pump 80 through valve 84.

When pressure in chamber 46 stabilizes at a high vacuum, preferably from $10^{-5}$ to $10^{-6}$ Torr, computer 92 closes valve 82 and opens gas valves (not shown) to allow gas to enter interior area 46 through nozzles 50 and 52. The gas injection raises pressure 20 in area 46 to approximately 50 millitorr. Pump 76 continues to pump the chamber so that as gas is continuously injected into chamber 46 by nozzles 50 and 52, gas is also removed from the chamber by pump 76. With the gas running, computer 92 causes power source 72 to activate magnetrons 48 at a power level of 0.75 kw.

During the magnetrons' initial stabilization period, inner drum 44 is disposed as shown in FIG. 6. A filter substrate is held in only the center substrate bracket 66. Referring also to FIG. 7, the substrate is held in the bracket's center hole 68 and is secured in the hole by a set screw 100.

The materials that form the optical filter layers are generated by the interaction between the magnetrons and the plasma formed at their surfaces. As discussed above, $SiO_2$ and $Nb_2O_5$ are preferred layer materials. Accordingly, the surfaces of the two magnetrons on the right side of housing 42 (as seen in FIG. 6) extending into chamber 46 are made of Si, while the surfaces of the left-side magnetrons are made of Nb. In the deposition process described below, only one of the magnetron pairs is activated at a time, depending on which layer material is being deposited.

In a preferred embodiment, nozzles 50 and 52 inject argon and oxygen into chamber 46. As should be understood in the art, argon ionizes and begins moving along the magnetic flux lines at the magnetron faces as the magnetrons stabilize after start-up. When the right-side magnetrons are activated, argon ions impact the Si magnetron surfaces, ejecting Si atoms from the magnetron into the plasma. The atoms react with the oxygen, and the resulting $SiO_2$ deposits on the faces of drum 44 opposite the magnetrons. When the left-side magnetrons are activated, the argon ions knock Nb atoms into the plasma, and the Nb reacts with oxygen to form $Nb_2O_5$. During the stabilization period, when the substrate is in the center substrate bracket between the two upper magnetrons, no appreciable $SiO_2$ or $Nb_2O_5$ (depending on which magnetrons are active) deposits on the substrate. Vanes 74 tend to inhibit gas flow within the inner drum that might create a deposit on substrate's underside.

To deposit $SiO_2$ or $Nb_2O_5$ on the substrate's outer surface, computer 92 activates motor 96 so that drum 42 rotates within chamber 46, thereby passing the substrate successively in front of the two activated magnetrons. As should be understood in the art, the rate at which the material deposits on the substrate depends upon the pressure at which argon is injected into the chamber, the magnetron power and the rate at which inner drum 44 rotates, and it should be well understood how to define these parameters to achieve a desired deposition rate so that the coating is formed to a desired thickness.

Figure 9:
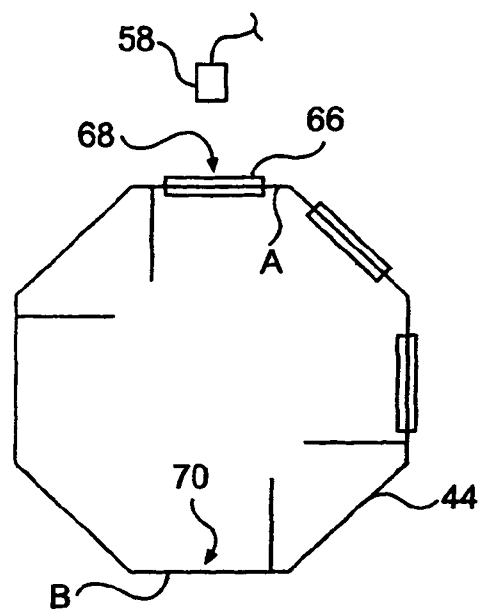
FIG. 9 is a front view of the inner drum shown in FIGS. 5 and 6.
Figure 9:
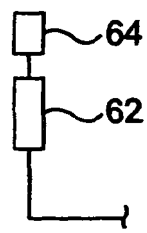

Computer 92 receives the desired thickness of the initial layer from computer 94 and can therefore rotate drum 44 to apply $SiO_2$ or $Nb_2O_5$ to the substrate at the desired thickness. In a preferred embodiment, however, computer 92 drives drum 44 so that the layer is at a target thickness some predetermined level below its full desired thickness, for example 15% below. That is, drum 44 rotates until the first layer is approximately 85% of its desired thickness. At this point, computer 92 stops the gas flow into interior area 46 and rotates drum 44 to the position shown in FIG. 9. The computer activates light source 62 so that a light beam passing from collimator 64 passes through one of the slots 70 (FIG. 8), through the interior of drum 44, through the open circular bore 68 (FIG. 7) of the top-most substrate bracket 66, and then to light sensor 58. The resulting light signal passes to spectrometer 60, which thereby produces an intensity spectrum $I_0$ of the light source. This information downloads to computer 94 through computer 92.

Figure 10:
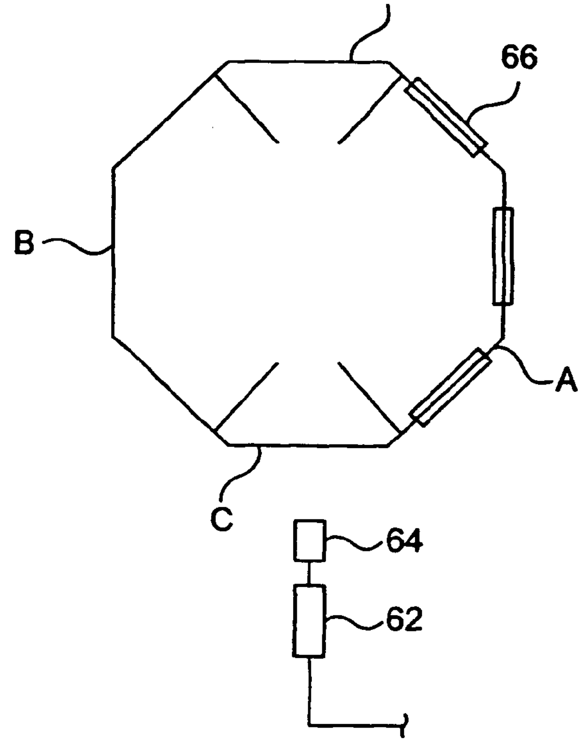
FIG. 10 is a front view of the inner drum shown in FIGS. 5 and 6.
Figure 11:
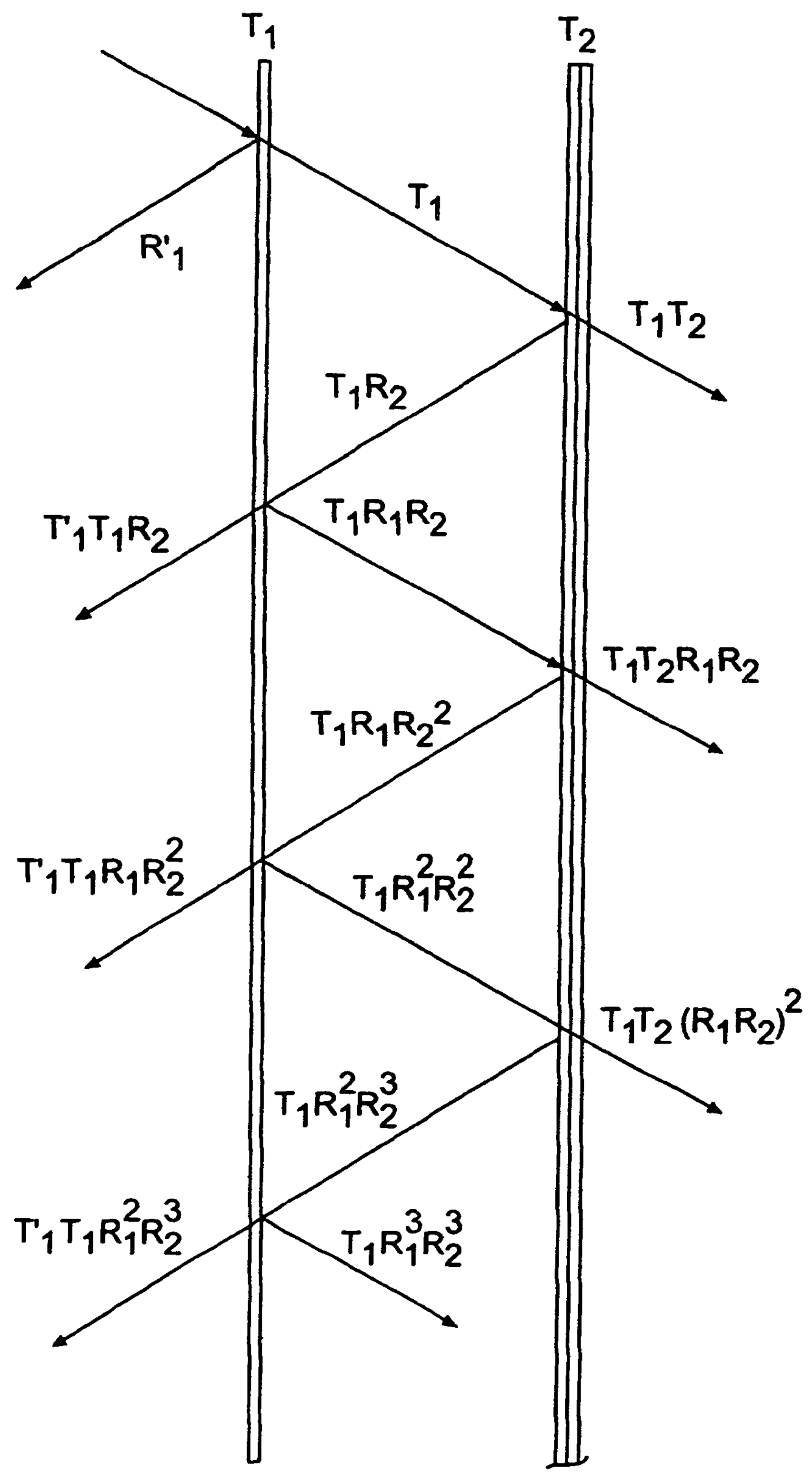
FIG. 11 is a schematic illustration of a one layer optical filter.

Computer 92 rotates drum 44 to the position shown in FIG. 10. Here, solid side wall surfaces C block the light source from view of light sensor 58. Thus, a "dark" spectrum is recorded by spectrometer 60 and computer 94. The dark spectrum records stray light that may be present within the system.

Computer 92 then rotates the drum back to its position as shown in FIG. 6 and activates light source 62 so that spectrometer 60 and computer 94 record a measurement spectrum I that is equal to the light source spectrum $I_o$ modified by the filter's substrate and newly-deposited layer. Computer 94 subtracts the dark spectrum from both $I_o$ and I and determines the filter segment's transmission spectrum by dividing I by $I_0$, and multiplying by 100, at each wavelength channel. This spectrum is referred to below as the filter segment's "actual" spectrum.

In one embodiment, the system modifies the actual spectrum to account for the difference in angle of incidence between the first-layer filter segment and the finished optical filter. As indicated above, the finished optical filter is designed to operate at a 45 degree angle of incidence, and the transmission spectrum analysis described above proceeds under that condition. The filter segment's spectrum, however, is measured in system 40 at a 0 degree angle of incidence, and the system therefore converts the segment's measured transmission spectrum to a 45° angle of incidence according to the following function:

$$\lambda_\theta=(\lambda_o/n)(n^2-\sin^2\theta)^{1/2},$$

where $\lambda_o$ is the wavelength channel at 0°, $\lambda_\theta$ is the wavelength channel at 45°, n is the filter segment's index of refraction, and θ is the change in angle from 0° to 45°, i.e. 45°. Thus, if the filter segment's measured spectrum has a certain transmission value at wavelength channel $\lambda_o$ at 0 degrees, that transmission value shifts to channel $\lambda_\theta$ at a 45 degree angle of incidence.

Computer 94 stores the substrate's thickness and knows the first layer's target thickness (in the present example, 85% of the thickness derived from the optimization algorithm above), and it can therefore determine what the transmission spectrum of this combination should be (hereinafter the "calculated" spectrum), using the matrix procedure described in the Background section. Where the actual spectrum is modified to a 45° angle of incidence, the target spectrum is calculated at the same angle. In another preferred embodiment, however, the target spectrum is calculated for 0° ("normal") incidence, and the actual spectrum is therefore not modified.

Computer 94 then compares the measured actual transmission spectrum to the calculated transmission spectrum in a merit function as follows:

$$MF=(1/m(\Sigma^m_{i=1}(T_a-T_c)^2))^{0.5},$$

where $T_a$ is the actual transmission spectrum value at wavelength channel i, $T_c$ is the calculated transmission spectrum value at that channel, and m is the number of wavelength channels.

The system then optimizes the merit function for the calculated spectrum, using the thickness of the first layer as the single optimization variable in moving the calculated spectrum closer to the actual spectrum. As a function of only the first layer's thickness, the merit function defines a two-dimensional curve. The merit function's value resulting from the comparison between the actual spectrum and the 85% calculated spectrum is a point on this curve from which a curve minimum may be found in a quasi-Newton method. As should be understood in this art, the optimization method iteratively changes the first-layer thickness from its starting point (in this example, 85% of the initial optimized first layer thickness) until reaching a minimum merit function value. At this point, the calculated spectrum is as close as possible to the actual spectrum, and the thickness corresponding to the target spectrum is considered to be the actual thickness of the first layer in the filter segment. That is, beginning at the initial calculated layer thickness, the system optimizes the difference between the actual and calculated spectra to provide a measurement of the layer's actual thickness.

The difference between this measured thickness and the calculated thickness may reflect an inaccuracy in the assumptions employed in depositing the layer. As noted above, the deposition rate depends on gas injection rate, magnetron power level and drum rotation rate. To the extent the deposition rate is different from the expected rate in the first deposition, one or more of these variables may be changed. Preferably, magnetron power level and drum rotation rate are modified so that a desired thickness can be added in a discrete number of passes in front of the active magnetrons. Methods of adjusting sputtering deposition rates to achieve a desired rate should be well understood and are therefore not discussed in detail herein.

The deposition rate of system 40 is adjusted responsively to the difference between the first layer's measured thickness and the target thickness so that the system can apply a predetermined thickness to the first layer in the next deposition pass. In one preferred embodiment, the system adds thickness in one-half increments toward the desired thickness. For example, if the target thickness in the first pass was 85% of the desired thickness (in this example, the initial optimized first layer thickness), but the measured thickness was 88% of the desired thickness, the system attempts in the next pass to bring the first layer thickness to 94% and, therefore, adjusts the system's deposition rate so that the system can apply the additional 6% in a discrete number of passes across the active magnetrons. Computer 92 re-activates system 40 and rotates drum 44 to apply the additional thickness. Computer 94 then determines the filter segment's new transmission spectrum, measures the layer's new thickness, and determines the next half-increment to add to the layer.

The system repeats this procedure until it is no longer practical to increase the thickness. For example, it is generally impractical to increase the layer's thickness by less than 0.5 nm. Thus, if the difference between a measured actual thickness and the ultimately desired thickness is 1 nm or less, it is assumed that the closest fit to the desired thickness has been achieved, and deposition stops.

At the end of the iterative deposition process, the system has a measurement of the first layer's actual final thickness. Of course, the substrate's thickness is also known, as are the substrate material and first-layer material. Accordingly, and referring again to FIG. 3, computer 94 establishes the substrate material and thickness, and first-layer material and thickness, as initial conditions at step 14 and determines a new filter design solution, beginning with one or more guesses for the remainder of the filter's layers at 16. That is, the substrate and the first layer become the substrate for the subsequent layers in a re-optimization of the filter design that therefore accounts for inaccuracies that may be present in the first layer. Reactive magnetron sputtering system 40 then adds the next layer (using the opposite magnetron pair) according to the thickness determined at the new optimization. Again, the system initially adds 85% of the desired layer thickness, measures the layer's actual thickness and incrementally increases the layer's thickness toward the desired thickness. After depositing the second layer, computer 94 again determines a new filter solution, this time using the substrate and first two layers as initial conditions. Sputtering system 40 iteratively deposits the third layer, and the procedure repeats for all subsequent layers.

Eventually, the thicknesses of all layers added by the filter design algorithm fall below the thickness criteria. As described above, these layers are eliminated, and the algorithm is unable to add any new layers to improve the filter design. Thus, layer deposition is complete, and the filter is complete.

While preferred embodiments of the invention have been described above, it should be understood that any and all equivalent realizations of the present invention are included within the scope and sprit thereof. Thus, the embodiments depicted are presented by way of example only and are not intended as limitations upon the present invention. Therefore, it is contemplated that any and all such embodiments are included in the present invention as may fall within the literal or equivalent scope of the appended claims.

Experimental Results

A set of sample data spectra and associated measurement values were used as the basis for optical filter designs according to the above-described algorithms. In addition, an optical filter design was determined according to a regression vector derived from the sample set. The filters' performances were compared.

The sample spectra related to mixtures of varying amounts of two water-soluble dyes from Aldrich Chemical Company. BISMARCK BROWN (BB) has a maximum absorbance at 457 nm, a dye content of 50%, and a distilled water content of 50%. CRYSTAL VIOLET (CV) has a maximum absorbance at 590 nm and a dye content of 95%. From solutions of BB at $8.23\times10^{-5}$M and CV at $3.77\times10^{-5}$M, forty stock solutions were prepared in which the concentration of BB and CV varied independently. Random numbers were used to determine the concentrations in each solution, with the provision that the transmittance spectrum of each diluted mixture was between 30% and 70%.

BISMARCK BROWN was chosen as the analyte because the CV spectrum overlapped the BB at all wavelengths. That is, the BB concentration in each solution was the measurement value that was to be associated with the sample spectra. The sample spectra were acquired between 400 nm and 650 nm on a Hewlett-Packard UV-VIS diode array spectrometer (Model 8543). The emission spectrum of the source lamp used to generate the sample spectra, the transmission spectrum of a band pass filter used in obtaining the sample spectra, and the response functions of the detectors used to detect the sample spectra, were convolved with the initial sample spectra to arrive at final sample spectra. Because the optical filter design assumes a tilted filter as discussed above, it was assumed that a pair of detectors were used to respectively measure transmittance and reflectance.

The forty stock solutions were divided into two groups of twenty solutions. The first group was used as a calibration group, while the second group was used as a validation group. The calibration group was used to (1) determine a principal component regression vector for which an optical filter was designed and (2) to derive two groups of filter designs according to the algorithms discussed above with respect to FIG. 3. The sample spectra of the validation group were then applied against the filter designs, and the results were compared against the validation group measurements to determine the accuracy of the designs. A standard error of calibration (SEC) reflects how each design matched the calibration set. A standard error of prediction (SEP) described how well the design predicted the validation group measurements.

Principal component analysis is described in the '531 patent. In general, however, principal component regression (PCR) is used to define a regression vector that correlates the wavelength channels in the sample spectra to the BB concentration in each sample but that is orthogonal to the interferent CV concentration. The initial step in the PCR analysis involves dimension reduction by use of the truncated singular value decomposition (SVD) of an n by m matrix of calibration spectra. The resulting PCA model is used to estimate a regression vector that can be used for prediction, where the number of principal components is selected to give adequate prediction properties to the regression model.

A four-factor PCR calibration model was constructed for the calibration sample spectra. A plot of the root mean squared error of cross validation against number of principal components showed that four principal components were required for optimum predictive ability. The SEC was 0.0907 micro-moles/liter (μM), corresponding to 1.0% error relative to the mean calibration set. The four-factor model was validated with the validation set of sample spectra, and the SEP was estimated to be 0.2583 μM, or 2.8% relative to the mean of the calibration set. A slight amount of curvature was observed in the calibration curve because of the nature of the tilted filter instrument used to develop the sample spectra.

The design algorithm described in the Background section above was used to derive a filter design from the principal component regression vector. A "target" transmission spectrum was derived from the regression vector with an arbitrary scaling factor and an offset as follows:

$$T(\%)=50+1.85R,$$

where T is percent transmittance, and R is the regression vector. Because the spectra primarily varied between 423 nm and 624 nm, this range was chosen as the operational band.

An initial "calculated" transmission spectrum was determined based on an initial guess of the number of filter layers and their thicknesses. The calculated spectrum was iteratively modified toward the target spectrum through optimization of a merit function as in equation 1b. The optimization result produced layer thicknesses that provided a final transmission spectrum. Solving for the corresponding regression vector in the above equation, the SEC and SEP of the filter design were determined to be 0.4471 μM and 0.4908 μM, respectively.

Optical filter designs according to the present invention were determined using two of the methods described above. In the first, a plurality of sets of initial conditions were selected, where each set included a random number of layers and a thickness for each layer. Each set was optimized as discussed above with respect to FIG. 3. The table below shows the number of filter layers in several of the resulting filter designs, along with the SEC and SEP for each design. In this case, the best overall filter gave better predictions than a four-factor PCR regression.

| Final No. of Layers | SEC | SEP | RMS Error |
|---|---|---|---|
| 15 | 0.2587 | 0.4151 | 0.3459 |
| 20 | 0.2546 | 0.4025 | 0.3368 |
| 25 | 0.2510 | 0.4026 | 0.3355 |
| 30 | 0.2435 | 0.3782 | 0.3181 |
| 35 | 0.2574 | 0.4167 | 0.3463 |

In the second approach, an initial filter design guess was first optimized to approximate a PCR regression vector. In this case, the PCR regression vector described above was used as the target, and the initial guess was a twenty-five layer filter, where each layer thickness was 100 nm. After optimizing the RMS function shown at equation 22 above, the resulting layer thicknesses were used as an initial guess in the optimization procedure discussed above with respect to FIG. 3. The final design included 19 layers.

What is claimed is:

1. Within a method of making an optical interference filter having thin layers of alternatingly high and low indices of refraction, a method of determining layer thicknesses, said method comprising the steps of:

(a) providing sample spectra and measurements of a predetermined characteristic associated with respective said sample spectra;

(b) selecting an initial number of said layers;

(c) selecting a thickness for each layer of said number of layers;

(d) determining a transmission spectrum of an optical filter having said number of layers and said selected thickness of each said layer;

(e) defining a first regression formula that relates an interaction of light with said transmission spectrum to a regression value;

(f) applying each said sample spectrum to said regression formula, thereby determining said regression value for each said sample spectrum;

(g) defining a comparison relationship that compares said regression values and said measurements; and (h) optimizing said comparison relationship for said regression values based upon minimization of differences between said regression values and said measurements, wherein thickness of each said layer is an optimization variable.

2. The method as in claim 1, wherein said regression formula includes a difference between first said light that is transmitted according to said transmission spectrum and second said light that is reflected according to said transmission spectrum.

3. The method as in claim 2, wherein said regression formula is defined as $Y=a_o+G(2T-1)\cdot S$, wherein Y is said regression value, $a_o$ is an offset value, G is a gain value, T is said transmission spectrum, and S is an actual spectrum of said light, and wherein said offset value and said gain value are optimization variables in said optimizing step.

4. The method as in claim 1, wherein said comparison relationship includes an average of the differences between said measurement and said regression value for each said sample spectrum.

5. The method as in claim 4, wherein said comparison relationship includes a root mean square of said differences.

6. The method as in claim 1, wherein said optimizing step includes a quasi-Newton optimization.

7. The method as in claim 1, including defining a tolerance level for said comparison relationship, comparing said comparison relationship optimized at step (h) with said tolerance level, and where said optimized comparison relationship is beyond said tolerance level, repeatedly increasing said initial number of layers and executing steps (c)–(h) until said optimized comparison relationship falls within said tolerance.

8. The method as in claim 1, wherein said optimizing step includes eliminating any said layer for which said thickness falls below a predetermined level during optimization.

9. The method as in claim 8, including
selecting a plurality of sets of initial conditions at steps (b) and (c), wherein each said set includes a selection of a number of layers and respective layer thicknesses,
executing steps (d)–(h) for each said set, and
selecting a group of layer thicknesses associated with said comparison relationship optimized at step (h) for one of said sets.

10. The method as in claim 1, including
determining a second regression formula that relates said sample spectra to said measurements,
defining a comparison relationship between said first regression formula and said second regression formula,
optimizing said last-mentioned comparison relationship for said regression formulas, wherein thickness of each said layer is an optimization variable,
replacing said thicknesses selected at step (c) with thicknesses optimized in said last-mentioned optimizing step and re-defining said first regression formula based on thicknesses associated with said comparison relationship optimized at said last-mentioned optimizing step, and
executing steps (f)–(h) based on said replaced thicknesses and said re-defined first regression formula.

11. The method as in claim 1, including
(i) forming an optical filter segment comprising a first layer of said optical interference filter, based on a thickness for said first layer determined at step (h),
(j) determining an actual thickness of said first layer formed at step (i),
(k) where said actual thickness is less than a desired thickness of said first layer, adding a thickness to said first layer based on the difference between said actual thickness and said desired thickness.

12. The method as in claim 1, including
(i) forming an optical filter segment comprising a first layer of said optical interference filter, based on a thickness for said first layer determined at step (h),
(j) measuring a transmission spectrum of said filter segment,
(k) determining an actual thickness of said first layer based on said transmission spectrum determined at step (j),
(l) comparing said actual thickness to a desired thickness of said first layer,
(m) where said actual thickness is less than said desired thickness, adding a thickness to said first layer based on the difference between said actual thickness and said desired thickness.

13. The method as in claim 12, wherein said desired thickness is said thickness for a first layer determined at step (h).

14. The method as in claim 13, including, following step (m), comparing said difference between said actual thickness and said desired thickness to a predetermined threshold and repeatedly executing steps (j)–(m) until said difference between said actual thickness and said desired thickness falls below said threshold.

15. The method as in claim 13, including, following step (m), the step (n) repeating steps (b)–(h), including
selecting a thickness of said first layer resulting from step (m) as said thickness for said first layer at the repeated step (c), and
excluding thickness of said first layer as an optimization variable at the repeated step (h).

16. The method as in claim 15, including, following step (n), repeating steps (i)–(n) for successive layers of said optical filter, wherein each repeated step (i) includes forming each said successive layer on the said layer at the previous step (i).

17. The method as in claim 13, wherein step (i) includes forming said first layer to a predetermined target thickness based on said thickness determined at step (h), and wherein step (k) includes
determining a target transmission spectrum of said optical filter segment, said target spectrum being a transmission spectrum that would be expected if said first layer were of said target thickness,
defining a comparison relationship between said transmission spectrum measured at step (j) and said target transmission spectrum, and
optimizing said last-mentioned comparison relationship for said target spectrum, wherein thickness of said first layer is an optimization variable.

18. The method as in claim 11, including, following step (k), the step (l) repeating steps (b)–(h), including
selecting a thickness of said first layer resulting from step (k) as said thickness for said first layer at the repeated step (c), and
excluding thickness of said first layer as an optimization variable at the repeated step (h).

19. The method as in claim 18, including, following step (l), repeating steps (i)–(l) for successive layers of said optical interference filter, wherein each repeated step (i) includes forming each said successive layer on the said layer at the previous step (i).

20. Within a method of making an optical interference filter having thin layers of alternatingly high and low indices of refraction disposed on a substrate, a method of determining layer thicknesses, said method comprising the steps of:
(a) providing sample spectra and measurements of a predetermined characteristic associated with respective said sample spectra;
(b) selecting a substrate;
(c) selecting an initial number of said layers;
(d) selecting a material with which to make each layer of said number of layers;
(e) selecting a thickness for each layer of said number of layers;
(f) determining a transmission spectrum of an optical transmission filter having said substrate and having said number of layers, wherein each said layer is made of said material selected for said layer at step (d) and has said thickness selected for said layer at step (e);
(g) defining a first regression formula that relates an interaction of light with said transmission spectrum determined at step (f) to a regression value;
(h) applying each said sample spectrum to said first regression formula, thereby determining said regression value for each said sample spectrum;
(i) defining a comparison relationship that compares said regression values and said measurements, wherein said comparison relationship defines a comparison value based upon differences between said regression values and said measurements; and
(j) optimizing said comparison relationship for said regression values to a minimum said comparison value, wherein thickness of each said layer is an optimization variable.

21. The method as in claim 20, including
selecting a plurality of sets of initial conditions at steps (b), (c) and (d), wherein each said set includes a selection of a substrate, an initial number of said layers and respective thicknesses, and a material with which to make each said layer, executing steps (e)–(j) for each said set, and selecting a group of layer thicknesses associated with said comparison relationship optimized at step (j) for one of said sets, wherein said optimizing step includes eliminating any said layer for which said thickness falls below a predetermined level during optimization.

22. The method as in claim 20, including determining a second regression formula that relates said sample spectra to said measurements, defining a comparison relationship between said first regression formula and said second regression formula, optimizing said last-mentioned comparison relationship for said first regression formula, wherein thickness of each said layer is an optimization variable, replacing said thicknesses selected at step (e) with thicknesses optimized in said last-mentioned optimizing step and re-defining said first regression formula based on thicknesses associated with said comparison relationship optimized at said last-mentioned optimizing step, and executing steps (h)–(j) based on said replaced thicknesses and said re-defined first regression formula.

23. The method as in claim 20, including (k) forming an optical filter segment comprising a first layer of said optical interference filter, based on a thickness for said first layer determined at step (j), (l) measuring a transmission spectrum of said filter segment, (m) determining an actual thickness of said first layer based on said transmission spectrum determined at step (l), (n) comparing said actual thickness to a desired thickness of said first layer, said desired thickness being a thickness for said first layer determined at step (j), (o) where said actual thickness is less than said desired thickness, adding a thickness to said first layer based on the difference between said actual thickness and said desired thickness.

24. Within a method of making an optical interference filter having thin layers of alternatingly high and low indices of refraction disposed on a substrate, a method of determining layer thicknesses, said method comprising the steps of:

(a) providing sample spectra and measurements of a predetermined characteristic associated with respective said sample spectra;

(b) selecting a substrate;

(c) selecting an initial number of said layers;

(d) selecting a material with which to make each layer of said number of layers;

(e) selecting a thickness for each layer of said number of layers;

(f) determining a transmission spectrum of an optical transmission filter having said substrate and having said number of layers, wherein each said layer is made of said material selected for said layer at step (d) and has said thickness selected for said layer at step (e);

(g) defining a regression formula that relates an interaction of light with said transmission spectrum determined at step (f) to a regression value;

(h) applying each said sample spectrum to said regression formula, thereby determining said regression value for each said sample spectrum;

(i) defining a comparison relationship between said regression values and said measurements, wherein said comparison relationship defines a comparison value based upon differences between said regression values and said measurements;

(j) optimizing said comparison relationship for said regression values to a minimum said comparison value, wherein thickness of each said layer is an optimization variable;

(k) forming an optical filter segment comprising a first layer of said optical interference filter, based on a thickness for said first layer determined at step (j), (l) measuring a transmission spectrum of said filter segment;

(m) determining an actual thickness of said first layer based on said transmission spectrum determined at step (l);

(n) comparing said actual thickness to a desired thickness of said first layer, said desired thickness being said thickness for said first layer determined at step (j);

(o) where said actual thickness is less than said desired thickness, and where the difference between said actual thickness and said desired thickness is greater than a predetermined threshold, adding a thickness to said first layer of one-half said difference;

(p) following step (o), repeatedly executing steps (l)–(o) until said difference falls below said threshold;

(q) following step (p), repeating steps (b)–(j), including selecting a thickness of said first layer resulting from step (p) as said thickness for said first layer at the repeated step (e), and excluding thickness of said first layer as an optimization variable at step (j); and (r) following step (q), repeating steps (k)–(q) for successive layers of said optical interference filter, wherein each repeated step (k) includes forming each said successive layer on the said layer at the previous step (k).

* * * * *

UNITED STATES PATENT AND TRADEMARK OFFICE

CERTIFICATE OF CORRECTION

PATENT NO. : 7,138,156 B1
APPLICATION NO. : 09/964194
DATED : November 21, 2006
INVENTOR(S) : Michael L. Myrick et al.

It is certified that error appears in the above-identified patent and that said Letters Patent is hereby corrected as shown below:

Column 4, line 66, after "equation" please delete "2" and replace with --15--.
Column 7, line 27, (equation 22), after "Σ" please insert --$^{n}$-- and delete "$^{n}$" after "$_{i=1}$".
Column 10, line 60, after "pressure" please delete "20".
Column 14, line 31, please delete "$_{5}$" and insert --$^{5}$--, as it is part of the numerical equation.

Signed and Sealed this

Twenty-sixth Day of June, 2007

JON W. DUDAS
*Director of the United States Patent and Trademark Office*